J. G. Perry.
Harvester.
No 4008 Reissued May 31, 1870.
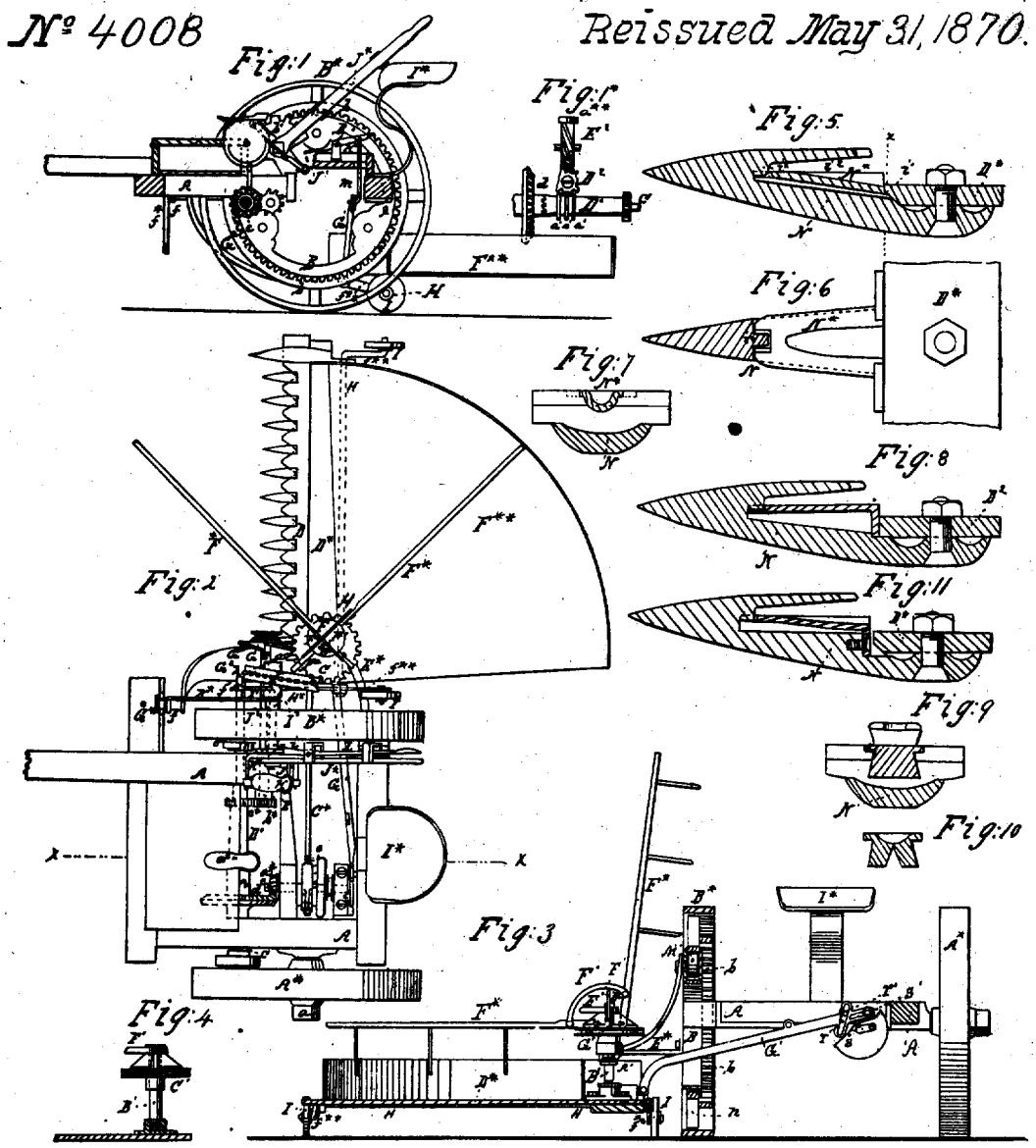
Witnesses.
A. Declare
A. Kimmer
Inventor.
J. G. Perry
per Brown Coombs & Co
attys

J. G. Perry.

Harvester.

No. 4008 Reissued May 31, 1870.

Witnesses
A. Lecerc
A. Kinnier

Inventor
J. G. Perry
per Brown & Coombs
attys

United States Patent Office.

JOHN G. PERRY, OF KINGSTON, RHODE ISLAND.

*Letters Patent No.* 86,584, *dated February* 2, 1869; *reissue No.* 4,008, *dated May* 31, 1870.

IMPROVEMENT IN HARVESTERS.

The Schedule referred to in these Letters Patent and making part of the same.

*To all whom it may concern:*

Be it known that I, JOHN G. PERRY, of Kingston, in the county of Washington and State of Rhode Island, have invented certain new and useful Improvements in Grain and Grass-Harvesters; and I do hereby declare that the following is a full, clear, and exact description of the same, reference being had to the accompanying drawing making a portion of this specification, in which—

Figure 1 represents a vertical transverse section of a harvester made according to my invention, taken in the line *x x* of fig. 2;

Figure 1* is a detached view of one portion of the same;

Figure 2 is a plan view of said harvester;

Figure 3 is a vertical transverse section of the same, taken at right angles to fig. 1;

Figure 4 is a detached view of one portion of the same attached to the finger-bar or shoe;

Figure 5 is a longitudinal section, showing one of the guard-fingers of the harvester;

Figure 6 is a horizontal section of the same;

Figure 7 is a vertical transverse section of the same, taken in the line *x x* of figs. 5 and 6;

Figure 8 is a vertical longitudinal section, and

Figure 12:
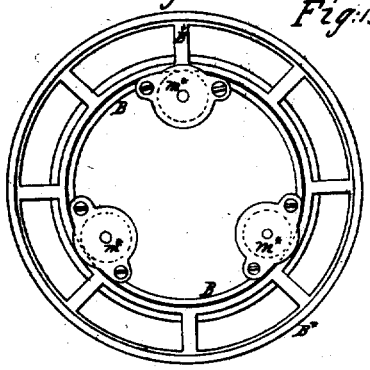
Figure 13:
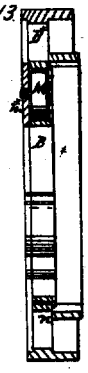
Figure 14:
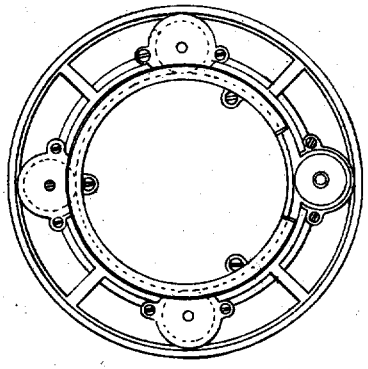

Figure 9, a transverse section, representing a modified form of guard-finger;

Figure 10 is a detached view, indicating a variation in the construction represented in figs. 8 and 9;

Figure 11 is a vertical longitudinal section of another form of guard-finger;

Figure 12 is a side view of the driving-wheel of the harvester as applied to its hollow axle;

Figure 13 is a vertical section, showing the same, and taken at right angles to fig. 12;

Figure 14, a side view, and

Figure 15:
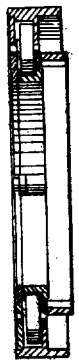
Figure 16:
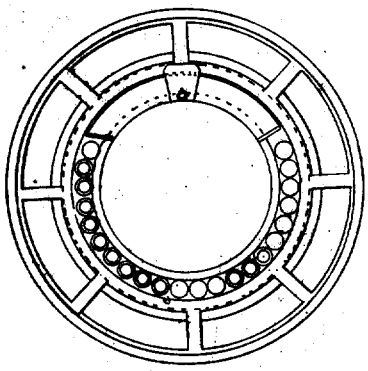

Figure 15, a transverse section of a modified form of driving-wheel and appliances thereof;

Figure 16, a side view, and

Figure 17:
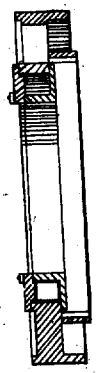
Figure 18:
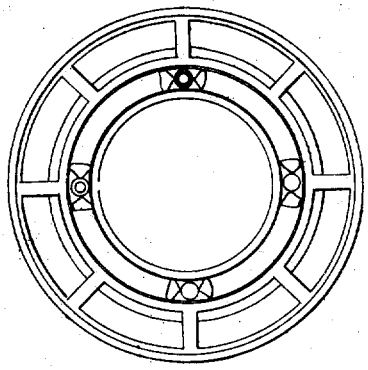
Figure 19:
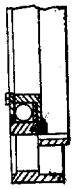

Figure 17, a transverse section of another form of driving-wheel, &c.;

Figure 18 is a view, with side plate removed, of another form of driving-wheel; and Figure 19 is a partial transverse section of the same.

Similar letters of reference indicate corresponding parts in all the figures.

This invention consists in certain novel combinations and arrangements of parts, whereby the facility and efficiency with which a grain or grass-harvester may be operated are very materially increased as compared with those hitherto in use.

To enable others to understand the construction and operation of my invention, I will proceed to describe it with reference to the drawing.

The horizontal frame A is furnished at one side with a short axle, *a*, and at the other with an annular or hollow axle, B.

Upon these axles, respectively, are placed the two supporting-wheels A* and B*, each of which is furnished at its inner side with an internally-toothed rim, *b*.

The rims *b* of these two wheels gear into loose pinions *c*, carrying pawls working into ratchet-wheels secured on the ends of a shaft, C, which carries a bevel-wheel, *d*, gearing with a bevel-pinion, *a**, on the end of the crank-shaft *e*, which latter actuates the pitman C* of the sickle D of the finger-bar D*.

The bevel-gear wheel *d* is loose upon the shaft C, but is made fast thereto, when the machine is in operation, by means of a sliding sleeve, $D^1$, placed upon the shaft C, and caused to turn therewith by means of an internal groove and feather, the adjacent surfaces or ends of the sleeve and the hub being shaped to constitute a suitable clutch.

In order to provide for the longitudinal movement of the sleeve, requisite in thus throwing the shaft C in or out of gear with the sickle-driving mechanism, it is furnished with several circumferential or annular ribs, *a'*; and pivoted to the adjacent portion of the frame is a "working-piece," $D^2$, the lower end of which is provided with teeth gearing or meshing between the annular ribs of the sleeve $D^1$, and which is also furnished at its upper end with similar teeth, which fit the spirally-grooved or ribbed rear surface of a vibrating disk, $E^2$, attached to the frame, and capable of being worked to and fro by the application of the foot to a foot-piece, *a***, secured to the top thereof, so that, by simply tilting the disk backward, it will operate the toothed working-piece, to move the sleeve outward, and thus unclutch the bevel-gear wheel from the shaft.

Provided within the hollow axle B, at the forward side thereof, is a bearing, which sustains a shaft, E, the inner end of which is furnished with a pinion, *b**, which, when the sleeve $D^1$ is clutched with the bevel-gear wheel *d*, as hereinbefore explained, gears into a corresponding pinion, *c**, provided upon the outermost end of the sleeve, the two pinions being so arranged that, when the sleeve is moved outward, to unclutch the bevel-gear wheel from the shaft, the pinion *c** will be brought out of gear with the other one, *b**, in order that the movement of the rake-operating devices driven by the shaft E, and hereinafter fully described, may be stopped simultaneously with that of the sickle-driving mechanism.

Firmly bolted or otherwise secured to the hollow axle B, and extending outwardly therefrom, is a strong bracket, E*, underneath the other end of which is a plate, A', in which is a square hole arranged immediately under a circular hole or bearing formed in the adjacent outer portion of the bracket.

The square hole in the plate A′ receives the squared lower end of a shaft, B′, and prevents such shaft from turning.

Upon the cylindrical central portion of this shaft is fitted the cylindrical sleeve-like hub of a worm or chain-wheel, C′, such hub being fitted, in its turn, into the bearing, just mentioned, in the outer part of the bracket.

The upper end of the shaft B′ projects upward beyond the top of the worm or chain-wheel, and has attached thereto a cam or eccentric, F, the office of which will presently herein appear.

The revolving rakes and gatherers are indicated at F*, and are attached to the upper side of the worm or chain-wheel by horizontal pivots, and are arranged in pairs, the two heads opposite each other being connected by arc-shaped braces F′, in a position at an obtuse angle from each other, as shown in fig. 3.

Provided upon the outer end of the shaft E is a series of spiral fan-shaped blades, G, which gear into the teeth of the worm-wheel C′, and operate something after the manner of a worm, to communicate a rotary movement to such worm-wheel, thus enabling the shaft E to give a rotary motion around the shaft B′ to the rakes and gatherers F*.

Instead of the shaft E, motion may be communicated to the worm-wheel direct from the shaft C; or the shaft E, instead of being placed parallel with the shaft C, and having square or spur-pinions, may be placed at right angles to the shaft C within the frame, and have bevel-gearing at the same point of contact, and connect with the worm-wheel, through the open main wheel, by the spiral blades G; or, instead of the spiral blades G, a belt or chain and chain-wheels may be used to impart motion from the shaft C, shaft E, or crank-shaft *e*, to the worm or chain-wheel C′.

As the rake-heads are thus carried around in succession, each one, as it is brought in front of the eccentric F, is tilted forward by contact therewith until it falls to the horizontal position requisite in sweeping back over the platform F**, attached to and behind the finger-bar D* in any suitable way.

As the forward rake or gatherer thus descends, the one with which it is connected, as hereinbefore explained, is brought thereby to a nearly vertical position, so that, as it is carried around, it may pass the adjacent wheel of the machine without being interfered with thereby. The rakes and gatherers, as they are thus revolved, are let down in succession to gather the grain and sweep over the platform and rake the grain therefrom, and lifted to pass the wheel.

The inner end of the finger-bar D* has, extending forward therefrom, an upwardly-curved arm or shoe, $G^2$, at the end of which is a spur, *f*, which works through a slotted plate, *f**, attached to a bar, G*, which extends laterally from the front part of the frame A.

Near the rearmost edge of the same end of the finger-bar is pivoted the outer end of a bar, $G^1$, the inner extremity of which is attached, as hereinafter set forth, to the back of the frame at the opposite side thereof.

The finger-bar is, by these means, enabled not only to move vertically, but to have its forward edge raised or depressed, as may be desired.

Working through suitable bearings provided at the rearmost edge of the finger-bar D*, is a rod, H, placed parallel with the finger-bar, and furnished at each end with a backwardly-extending arm, *f***, at the outer extremity of which is arranged a caster-wheel, I.

The inner end of the rod H is furthermore furnished with a forwardly-extending lever, H*, in such manner that, by lifting this lever through any suitable agencies, worked from the seat I* of the machine, the rod H may be turned to bring the caster-wheels I further forward with reference to the finger-bar, thereby lifting the same a uniform distance throughout its entire length.

For the sake of greater convenience in thus operating the finger-bar, the extremity of the lever H* is connected by a chain, *f′*, with a lever-arm, $I^1$, extending forward and upward from the outer portion of a shaft, $I^2$, working through the upper forward portion of the hollow axle, and which is also provided with an arc, J, over which a chain, *h*, passes down to and is connected with the rear portion of the arm or shoe $G^2$.

The inner end of the shaft just mentioned is provided with a hand-lever, J*, and foot-lever $J^1$, whereby the shaft may be rocked or turned so as to simultaneously operate the lever H* to work the rod H, with its casters I, and the arc J, with its chain *h*, to lift the finger-bar.

The hand-lever may be held back to retain the finger-bar in its elevated condition by a pawl, L, pivoted thereto, and fixed to the inner side of the hollow axle.

The shaft $I^2$, just described, passes through a tubular shaft, $J^2$, which is sustained in appropriate bearings formed in the hollow axle, and which has, at its inner end, a foot-lever, K, and at its outer extremity a forwardly-projecting arm, K*, which, being curved downward, is bent loosely around the spur *f* of the shoe $G^2$, so that, by forcing downward the forward or rear portion of the lever K, the arm K* will hold the shoe $G^2$ at any point desired, as the case may be, so that, by this means, the angle to the ground of the cutting appliances may be varied at will.

Pivoted upon the frame A, in suitable proximity to the seat of the machine, is a tilting foot-piece, $K^2$, from the rear end of which there extends downward a rod, *m*, which is hooked into the bar $G^1$, so that, by pressing down upon the rear portion of this foot-piece, the bar $G^1$, and consequently the cutting apparatus, may be held down at will for close cutting.

On the other hand, by depressing the forward portion of the foot-piece, the bar $G^1$ and the cutting apparatus may be lifted to conform to the various surfaces and run lightly along, so that the cutters may be readily made to pass any obstacle of ordinary height or character, and as, in elevating the cutters, it is necesaary at the same time to elevate the raking apparatus to a corresponding extent, I arrange the vertical shaft B′, around which the worm-wheel C′, carrying the rakes, rotates, at the inner end, in rear of the finger-bar above the platform, and in sliding journals, as elsewhere described, so as to be lifted by the rise of the platform, without being thrown out of gear with the spiral blades G, or other operating medium.

The method of securing the wheel B* upon its hollow axle is as follows:

The axle is formed, externally, with cavities or recesses *u*, open at the circumference of the axle, and designed to receive friction-rollers M, which are so arranged that, when the wheel is placed upon the axle, the rollers will be interposed between the two, so as to diminish the friction which would otherwise occur.

One end of the pivot or axle of each friction-roller is fitted into a hole or bearing provided in the fixed or permanent side of the recess, and the other end of which fits into a like bearing formed in a detachable side-piece, *m**, bolted or screwed fast to close the outer or opposite side of such recess.

The side-pieces *m** are made to project beyond the adjacent inner edge of the wheel, and a flanch, *n*, being provided upon the axle at the opposite side of the wheel, serves to retain the wheel in its place, as well as to furnish a support for one end of each roller-pivot, as just explained.

It is highly desirable that when the finger-bar is lifted in a horizontal position, as hereinbefore fully explained, its movement should be truly vertical, and in order to insure this, the bar $G^1$, instead of having its inner-end attached to the rear of the frame A simply by a pivot, has its inner end formed with an oblique slot, *r*, through which passes a fixed pin, *r'*, and with a longitudinal slot, *s*, through which is passed another pin, *s'*.

The oblique slot *r*, when the cutter-bar is lifted, as just mentioned, enables the bar to move inward to such a degree as to insure the requisite vertical direction in the upward movement of the same, thus obviating the outward and forward thrust, which would otherwise occur in such movement by the movement upon the arc of a circle of the outer extremity of the bar.

The slotted guards or fingers N may be of any appropriate form, and are attached to the finger-bar in the usual or any suitable manner.

Provided internally, in the forward end of the slot or recess $i^2$ of the guard, is a stud, $i^*$.

The leger-blade N* is of the form shown more fully in fig. 1, depressed or recessed centrally at its rearmost portion, as indicated more plainly in fig. 6, and notched, at its forward end, to fit astride the stud $i^*$ just mentioned, which prevents any lateral movement of the forward end of the leger-blade, any upward movement of the same being provided against by the closeness with which it fits into the narrow portion of the slot or recess at either side of the stud.

The inner or rearmost end of the blade is provided with a small spur, $i^1$, which, fitting into a small notch, formed for its reception, at the back of the slot or recess in the guard, is held therein to retain in place the inner end of the leger-blade by the adjacent edge of the finger-bar, as shown more fully in figs. 5, 6, and 7.

Instead of being fastened in the precise manner just described, the inner end of the leger-blade may be turned downward at right angles, as indicated in figs. 8, 9, 10, and 11, the downwardly-extending spur thus formed being made of dovetail-form, and fitted into a recess of corresponding shape formed in that portion of the guard immediately in front of the finger-bar, this dovetail spur being either solid, as in fig 9, or, as is preferred, for the greater facility with which the leger-blades, as a whole, may be manufactured, split, or divided, as represented in fig. 10.

Furthermore, instead of these methods, the spur on the blade may be of any desired form, and fastened in place by a screw, as represented in fig. 11.

It now remains to explain certain modified means of attaching the wheel B* to the hollow axle, represented in the figures not heretofore adverted to, and which may be briefly explained as follows:

As shown in figs. 14 and 15, the friction-rollers, instead of being arranged upon or carried by the hollow axle, are placed in suitable cavities formed in or between the spokes, or between the rim and hub of the wheel, and run in contact with the periphery of the axle.

When made as shown in figs. 16, 17, and 18, the axle is of less diameter than the diameter of the opening through the hub of the wheel, the space between them being occupied for a greater or lesser portion of its circuit by either cylindrical or spherical rollers W, which serve to obviate friction in a manner similar to pivoted friction rollers, or, in place of this arrangement, the spherical or cylindrical rollers may be placed singly between check-pieces and clearers I, as at fig. 18, arranged by twos, at intervals, on a revolving ring, O, within the space between the axle and the wheel. These friction-rolls may be made hollow, for lightness and strength combined, and, instead of the check-pieces and clearer I, arranged by twos, each roll may run on a pin or pivot, V, made on the ring O, using one or more of the check-pieces carried by the ring O to remove the dirt and other foreign matter from the axle and keep it clean.

These open main wheels, as represented in figs. 14 and 15, are secured upon their axles by means of the friction-rollers running in a groove made in the periphery of the axle, and those in figs. 16 and 17 by flanches secured to the axle at opposite sides of the wheels, and those at figs. 18 and 19 by flanches secured to the inner side of the wheel, extending over the axle, leaving the outside end of the axle covered, to guard against dirt, and the hub may project over the upper part of the axle, and the lower portion of the axle over the hub, for more effectually keeping the dirt out of the joints.

What I claim as my invention, and desire to secure by Letters Patent, is—

1. The arrangement of the vibrating disk $E^2$, grooved or ribbed spirally at its rear circumferential portion, the toothed working-piece $D^2$ and the annular ribs *a'* of the sleeve $D^1$, clutching with the wheel *d*, whereby the sickle driving mechanism may be thrown in or out of gear.

2. The arrangement of the spur pinion $c^*$ of the sleeve $D^1$, clutching the wheel *d*, with reference to the spur pinion $b^*$ of the rake, operating the shaft E, substantially as and for the purpose described.

3. The arrangement of the spiral blades G ot the shaft E, with reference to the worm-wheel C', carrying the revolving rakes, whereby the requisite rotary movement is given to the rakes.

4. The arrangement of the cam or eccentric F, with reference to the wheel C', carrying the revolving rakes, connected in pairs by braces $F^1$, whereby the rakes may be raised or lowered automatically.

5. The arrangement of the bearing A', provided on the bracket E*, attached to the annular axle B of the wheel B*, with reference to the lower end of the fixed shaft B', having the cam or eccentric F at its upper end, whereby the retention of the cam or eccentric in proper position is secured.

6. The arrangement of the shaft B', worm-wheel C', and operating wheel G, with relation to the inner end of the platform, so that the raising of the latter shall elevate the rakes at the same time without throwing them out of gear, in the manner substantially as shown and described.

7. The arrangement of the levers $J^1$ and J*, working an arm, $I^1$, attached to the chain *f'*, lever H*, and the longitudinal rod H, situated back of the finger-bar, and having attached at either end thereof by an arm, *f***, a wheel, I, whereby the lifting of the finger-bar and its attachments is provided for.

8. The arrangement of the tilting bar $K^2$, and its rod *m*, with reference to the bar $G^1$, whereby the finger-bar may either be raised or held down, as may be desired.

9. The detachable side-pieces *m**, in combination with the friction-rollers M, so as to serve the double purpose of supporting one end of the friction-rollers M, and of retaining the wheel B* upon its annular axle B, as set forth.

10. The arrangement of the oblique slot *r*, in the bar $G^1$, with reference to the pin *r'*, in the main frame, whereby the finger-bar is enabled to rise vertically.

11. In a two-wheeled harvester, the combination of the grain platform, revolving rake, and reel, inner open or annular drive-wheel, and suitable driving mechanism, supported by the main frame, arranged substantially as described, so that both cutters and rakes may be driven directly through the open wheel.

JOHN G. PERRY.

Witnesses:
S. E. PERRY,
JOHN E. PERRY.